United States Patent
Wolf et al.

(10) Patent No.: US 6,519,522 B1
(45) Date of Patent: Feb. 11, 2003

(54) METHOD FOR DETERMINING A STARTING GEAR STEP

(75) Inventors: Andreas Wolf, Ravensburg (DE); Matthias Winkel, Weingarten (DE); Christoph Rüchardt, Wangen i. Allgäu (DE); Bertram Wengert, Markdorf (DE); Jürgen Müller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/763,043

(22) PCT Filed: Aug. 28, 1999

(86) PCT No.: PCT/EP99/06364

§ 371 (c)(1),
(2), (4) Date: Feb. 15, 2001

(87) PCT Pub. No.: WO00/14436

PCT Pub. Date: Mar. 16, 2000

(30) Foreign Application Priority Data

Sep. 2, 1998 (DE) .......................... 198 39 837

(51) Int. Cl.⁷ .............................. G06F 7/00; G06F 19/00
(52) U.S. Cl. ........................ 701/61; 701/54; 180/338; 180/343; 180/344; 477/37; 477/901
(58) Field of Search ............... 701/51, 61, 94, 701/55, 54; 180/179, 344, 338, 343; 477/174, 49, 50, 56, 900, 901, 37; 74/336 R, 640; 254/295, 311, 315

(56) References Cited

U.S. PATENT DOCUMENTS

| | | | | |
|---|---|---|---|---|
| 4,630,508 A | 12/1986 | Klatt | ............... | 74/866 |
| 4,648,291 A | 3/1987 | Klatt et al. | ............... | 74/866 |
| 4,759,739 A | * 7/1988 | Weir | ............... | 474/49 |
| 5,392,215 A | * 2/1995 | Morita | ............... | 123/352 |
| 5,406,862 A | 4/1995 | Amsallen | ............... | 74/336 R |
| 5,499,954 A | * 3/1996 | Wagner et al. | ............... | 477/174 |
| 6,278,195 B1 | * 8/2001 | Yamaguchi et al. | ............... | 290/40 A |

FOREIGN PATENT DOCUMENTS

| | | |
|---|---|---|
| DE | 33 34 718 A1 | 4/1985 |
| DE | 38 09 118 A1 | 10/1988 |
| DE | 41 20 540 C1 | 11/1992 |
| DE | 42 39 133 C1 | 12/1993 |
| DE | 36 11 256 C2 | 8/1994 |
| DE | 41 20 602 C2 | 2/1995 |
| DE | 197 05 956 C1 | 2/1998 |
| DE | 19807346 A1 * | 2/1998 |
| DE | 198 37 380.5 | 2/2000 |
| EP | 0 120 189 A2 | 10/1984 |
| EP | 0 268 686 A1 | 6/1988 |
| EP | 0 666 435 A2 | 10/1998 |
| JP | 406257664 A * | 9/1999 |

* cited by examiner

*Primary Examiner*—Thomas G. Black
*Assistant Examiner*—Ronnie Mancho
(74) *Attorney, Agent, or Firm*—Davis & Bujold, P.L.L.C.

(57) ABSTRACT

The invention relates to a method for determining a starting gear step for a vehicle with a stepped variable speed transmission with several gear steps. It is proposed that a maximum admissible value for a slip time (12) and/or a maximum admissible value for a frictional work (14) of the starting clutch during the starting process, the same as an available engine torque (10) for starting be determined, that beginning with a highest suitable gear step (18) for starting, values for the slip time (20) and/or the frictional work (22) be calculated in advance depending on the vehicle mass (8), that the precalculated values (20, 22) be compared with the maximum admissible values (12, 14), that the calculation loop be repeated with the next smaller suitable gear step for starting when at least one of the precalculated values is greater than the maximum admissible values and that a gear step be issued as starting gear step when the precalculated values are smaller than or equal to the maximum admissible values.

6 Claims, 2 Drawing Sheets

METHOD FOR DETERMINING A STARTING GEAR STEP

FIELD OF THE INVENTION

The invention relates to a method for determining a starting gear ratio for a vehicle having a stepped variable speed transmission with several gear ratios.

BACKGROUND OF THE INVENTION

Especially in the case of vehicles having multi-gear stepped variable speed transmissions, different gear ratios are suitable for starting of which one gear ratio is selected as the starting gear ratio according to load and driving mode.

In an unloaded industrial vehicle having a 16-gear transmission, for example, it can be advantageous for an optimum start on level roads to select the fifth gear as starting gear ratio, while in a fully loaded vehicle in an uphill road, it can be needed to start in the first or second gear. In a driving situation if too low a starting gear ratio is selected, this unnecessarily results in many gear changes. If the selected starting gear ratio is too high, the starting process lasts longer with the consequence of a higher load of the starting clutch or it has to be discontinued if the traction force available is not sufficient in the starting gear selected and started again.

When starting, the rotational speed difference, which in a stationary vehicle is between an engine-side and a transmission-side part of the starting clutch. During said slip phase, the starting clutch transmits a torque whereby the transmission input shaft and the vehicle are accelerated. During the slip phase, a considerable frictional work is produced in the starting clutch, customarily designed as dry clutch, whereby elevated temperatures are generated. At the end of the slip phase, the parts of the starting clutch rotate synchronously with the rotational speed of the engine. If too great a starting gear step is selected when starting, the acceleration of the transmission input shaft that can be achieved is only small so that the slip phase lasts much longer and the elevated temperatures generated can damage the starting clutch. On uphill gradient roads, there can occur the case in which the traction force is smaller than the gradient resistance whereby the vehicle starts to roll backwards.

While in vehicles, having conventional mechanical stepped variable speed transmissions, the driver chooses the starting gear step, methods for determining a starting gear step are preferably applied in automated stepped variable speed transmissions. It is possible to cause the suitable starting gear step be determined by an electronic control device and suggest it to the driver, e.g. via a display. Naturally, such a display can also be helpful for the driver in a vehicle having a conventional mechanical stepped variable speed transmission. It is also possible to let the calculated starting gear be automatically inserted by an automated stepped transmission or power shift transmission when reaching the parking state of the vehicle.

U.S. Pat. No. 5,406,862 discloses a method for determining a starting gear step in which the starting gear step is determined by an electronic control device according to the vehicle mass and the inclination of the road. In a characteristic field memory are stored the suitable starting gear steps according to the vehicle mass and the road inclination which is determined with a gradient sensor.

In different types or variants of vehicles, a specific transmission type is customarily used which can differ from each other in vehicle weight and in prime mover. The characteristic field in which the starting steps are stored has to be specifically covered for the variant, i.e. with different values for different vehicle variants.

The results of a specific value coverage of the characteristic field on the clutch load are not directly detectable in the process so that the results of a certain adjustment for the whole characteristic field have each to be expensively verified. Wrong adjustments can lead to destruction of the starting clutch.

Departing from the prior art, the problem of the invention is to develop for determining a starting gear a method which has a great reliability in relation to wrong adjustments, in which the adjustments are easily adaptable to different variants and which, taking into consideration the admissible load of the starting clutch, always makes the greatest possible starting gear step available.

The invention is solved by a method that includes the features of the main claim. Advantageous developments of the method are stated in the sub-claims.

SUMMARY OF THE INVENTION

According to the invention, the starting gear step is determined depending on an engine torque available for starting, a maximum slip time and/or a maximum frictional work of the starting clutch during the starting process. To this end, the available engine torque, a maximum admissible value for a slip time and/or a maximum admissible value for a frictional work of the starting clutch are first determined during the starting process. Beginning with a highest gear step suitable for starting, values for the slip time and/or the frictional work are then precalculated in a calculation loop according to the ratio of the gear step, the vehicle mass, the tractional resistance and an engine torque available for starting. The precalculated values are compared with the previously determined maximum admissible values. The calculation loop is repeated with the next smaller gear step suitable for starting until a gear step is found in which the precalculated values are smaller than or equal to the maximum admissible values. The gear step is issued as starting gear step. The tractional resistance is cyclically calculated during the travel in short time intervals so that after parking the vehicle an actual starting gear can be made available.

The respective optimum starting step is at the same time directly determined depending on the maximum loading capacity fo the starting clutch. The maximum loading capacity of the starting clutch is in no case exceeded. For adaptation to different vehicle variants, there are essentially vehicle parameters to be changed, such as the engine torque available for starting and tractional resistance coefficients which are usually known.

The maximum admissible values for the slip time and/or the frictional work are advantageously stored in the electronic control device—preferably in a characteristic field memory—according to road inclination, vehicle mass and/or load state of the clutch. Hereby is obtained a great reliability relative to wrong adjustments which can cause damage to the starting clutch. The engine torque available for starting can likewise be determined according to road inclination and/or vehicle mass; not in all driving situations need they be started under full engine load.

The vehicle mass can be delivered by the driver or also measured with sensors in the running gear. But it is especially advantageously determined using commonly existing wheel rotational speed sensors by a method where, during two measurements temporarily offset within a measuring period, a traction parameter and a motion parameter resulting therefrom are determined.

Such a method has been disclosed, e.g. in EP 0 666 435 A2 which comprises two temporarily offset measurements of the traction force produced by the prime mover and the acceleration resulting therefrom. It is to be assumed that the unknown tractional resistance in two consecutive measurements is substantially equal for both measurements so that the unknown parameters can be shortened. In this known method, both during a traction phase and during a traction-free phase, while one clutch is open for the purpose of gear change of a stepped variable speed transmission, a value of a wheel torque and a value of acceleration of the vehicle are respectively determined and from them can be calculated the actual mass of the vehicle.

It has proved especially advantageous when in a development of the method the first of the two measurements comprises a first data collection period, the second of the two measurements a second data collection period, the duration of both data collection period is longer than a minimum duration, the traction force parameter corresponds to the time integral of the traction force acting during the respective data collection period and the motion parameter corresponds to the speed change of the vehicle occurring during the respective data collection period. If this method is made, the basis for determining the mass, the starting gear step can be determined without an additional sensor being needed therefor.

The method for determining the mass is based on the following equation:

$$M_{Fzg} = \frac{\int_{t0}^{t1} F_{Zug}\,dt - M_{Gang}(v1 - v0)}{(v1 - v0 - v3 + v2)}$$

wherein:

| | |
|---|---|
| $M_{Fzg}$ | the vehicle mass to be determined in kg, |
| $F_{Zug}$ | the traction force or the engine torque calculated for the wheel in N, |
| $M_{gang}$ | a correction parameter corresponding to the sum of the inertia torques of engine, clutch and stepped variable speed transmission reduced to the translatory motion of the vehicle in kg, |
| $t_0, t_1$ | the beginning and ending moment of the traction force phase, |
| $v_0, v_1$ | the speeds of the vehicle at the beginning and end of the traction phase in m/s, |
| $v_2, v_3$ | the speeds at the beginning and end of the traction-free phase in m/s. |

At this point reference is had to the applicant's non-published older patent application DE 198 37 380.5 whose object is a method for determining mass. Its content is explained as pertinent to the disclosure content of the instant application.

In another advantageous development of the inventive method for determining a starting gear step, the parameter dependent on driving mode which comprises the ascending resistance is determined from the vehicle mass, an actual traction force and an actual vehicle acceleration resulting therefrom while the vehicle moves. Compared to the known method, hereby is spared a gradient sensor to determine the inclination of the road.

Another advantageous development of the method provides that the parameter dependent on driving mode comprise, together with the uphill resistance of the vehicle, the rolling resistance of the vehicle which also acts during the starting process. Hereby is better reproduced the positive tractional resistance which is mainly composed of the uphill resistance and the rolling resistance of the vehicle. The air resistance can be disregarded in the starting process.

From the parameters vehicle mass $M_{Fzg}$, actual traction force $F_{Zug}$ and vehicle acceleration $\alpha_{Fzg}$ can be calculated, by solving the motion equation, the traction resistance which is equal to the sum of the rolling and uphill resistances.

BRIEF DESCRIPTION OF THE DRAWINGS

The inventive method is explained in detail with the aid of the enclosed drawings which show.

DESCRIPTION OF THE PREFERRED EMBODIMENT

Figure 1:
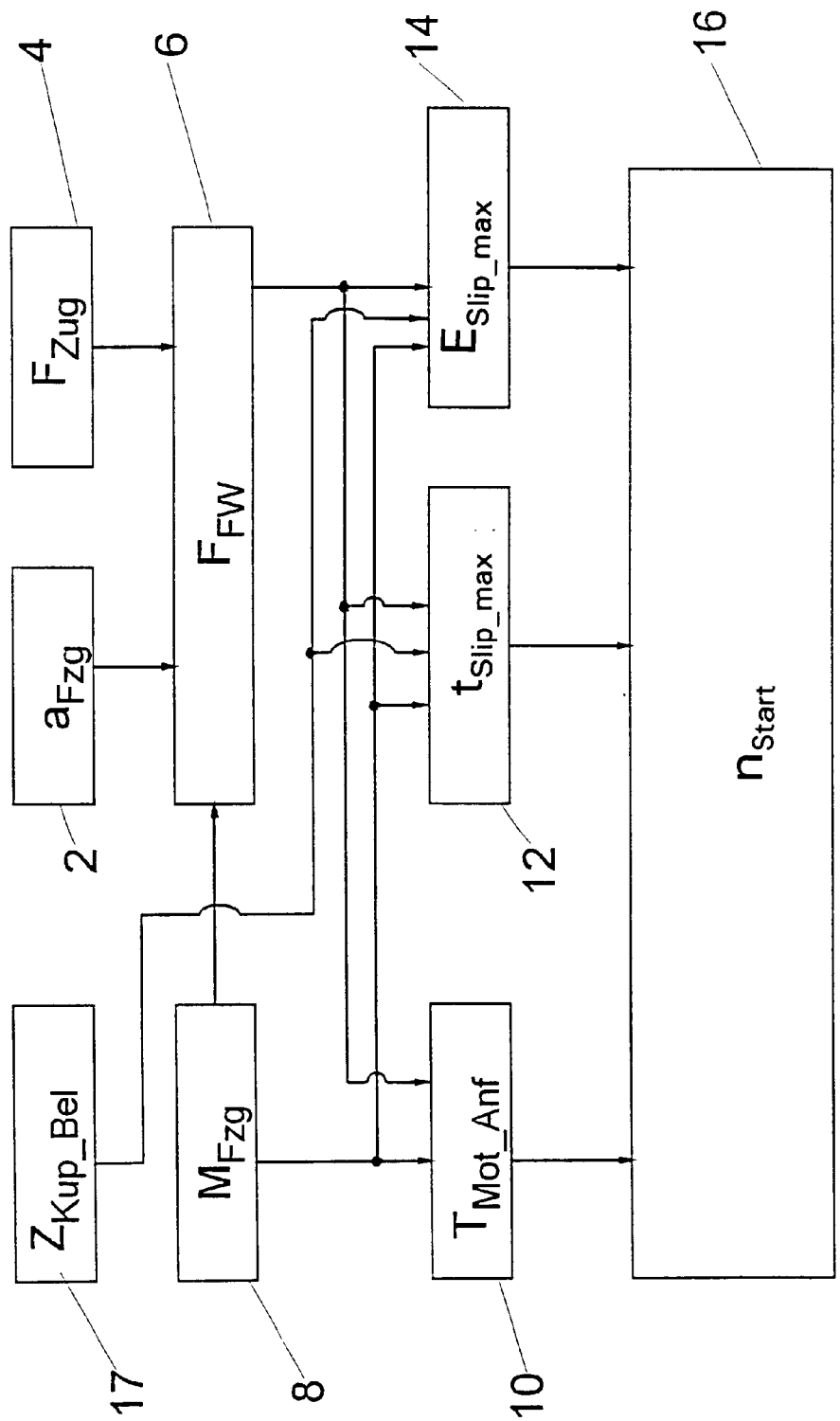
FIG. 1 a block diagram of the inventive method.

In FIG. 1, 6 is designated the block for calculating the tractional resistance according to the driving mode form the vehicle mass 8, the traction force 4 acting upon the input wheels and the vehicle acceleration 2 resulting therefrom. The engine torque 10 available for starting, the maximum admissible slip time of the starting clutch 12 during the starting process and the maximum admissible frictional work 14 are each determined according to the vehicle mass 8, the actual tractional resistance 6 and a parameter 17 descriptive of the load state of the clutch. In the block 16 is determined the starting gear according to said parameters 10, 12 14.

The following method steps go on separately in the blocks:

The momentary vehicle acceleration $\alpha_{Fzg}$ 2 corresponds to the periodic differentiation of the vehicle speed which is preferably absorbed by the sensors of the rotational speed.

The traction force $F_{Zug}$ 4 acting upon the input wheels of the vehicle is determined from engine torque and reduction ratio between engine and input wheel existing in the respective gear wherein the effectiveness of the individual components of the drive line is taken into account. The signal for the engine torque is preferably made available by the engine control or can alternatively be determined form the position fo the load sensor, of the engine rotational speed and of the engine characteristic field stored in the control device.

In block 6 the tractional resistance is determined according to the following equation, $$F_{FW} = F_{Zug} - M_{Fzg} * \alpha_{Fzg}$$

in which

| | |
|---|---|
| $F_{Zug}$ | traction force |
| $M_{Fzg}$ | vehicle mass |
| $\alpha_{Fzg}$ | vehicle acceleration. |

On the other hand, the traction resistance, when the air resistance is disregarded is equal to the sum of the uphill gradient and rolling resistances.

$$F_{FW} = F_{Steig} + F_{Roll} = M_{Fzg} * g(\sin(\alpha) + k_{Roll0} \cos(\alpha))$$

wherein

| | |
|---|---|
| g | acceleration due to gravity |
| α | angle of inclination and |
| $k_{Roll0}$ | speed-dependent rolling resistance coefficient. |

By comparing the above two equations the actual angle of inclination a can also be determined when needed.

The engine torque 10 available for starting, the maximum admissible slip time 12 during the starting process, the same as the maximum admissible frictional work 14, are advantageously stored in characteristic field memories of the electronic control device according to the vehicle mass 8, the tractional resistance and the load state of the clutch 17. The greater the vehicle mass and traction resistance and the smaller the former clutch load, the grater the values of the parameters stored in the characteristic fields. By the parameters stored in the characteristic fields, the load of the starting clutch can be directly controlled and upwardly limited with certainty.

The load state of the clutch can be described, for ex., with reference to temperatures or with reference to the time elapsed since the last clutch load. Specifically suitable to describe the load state is a mathematical parameter which takes into account the frictional work accumulated on the clutch in the course of time and evaluates the frictional works lying longer in the past less strongly than the frictional works lying closer in time.

Figure 2:
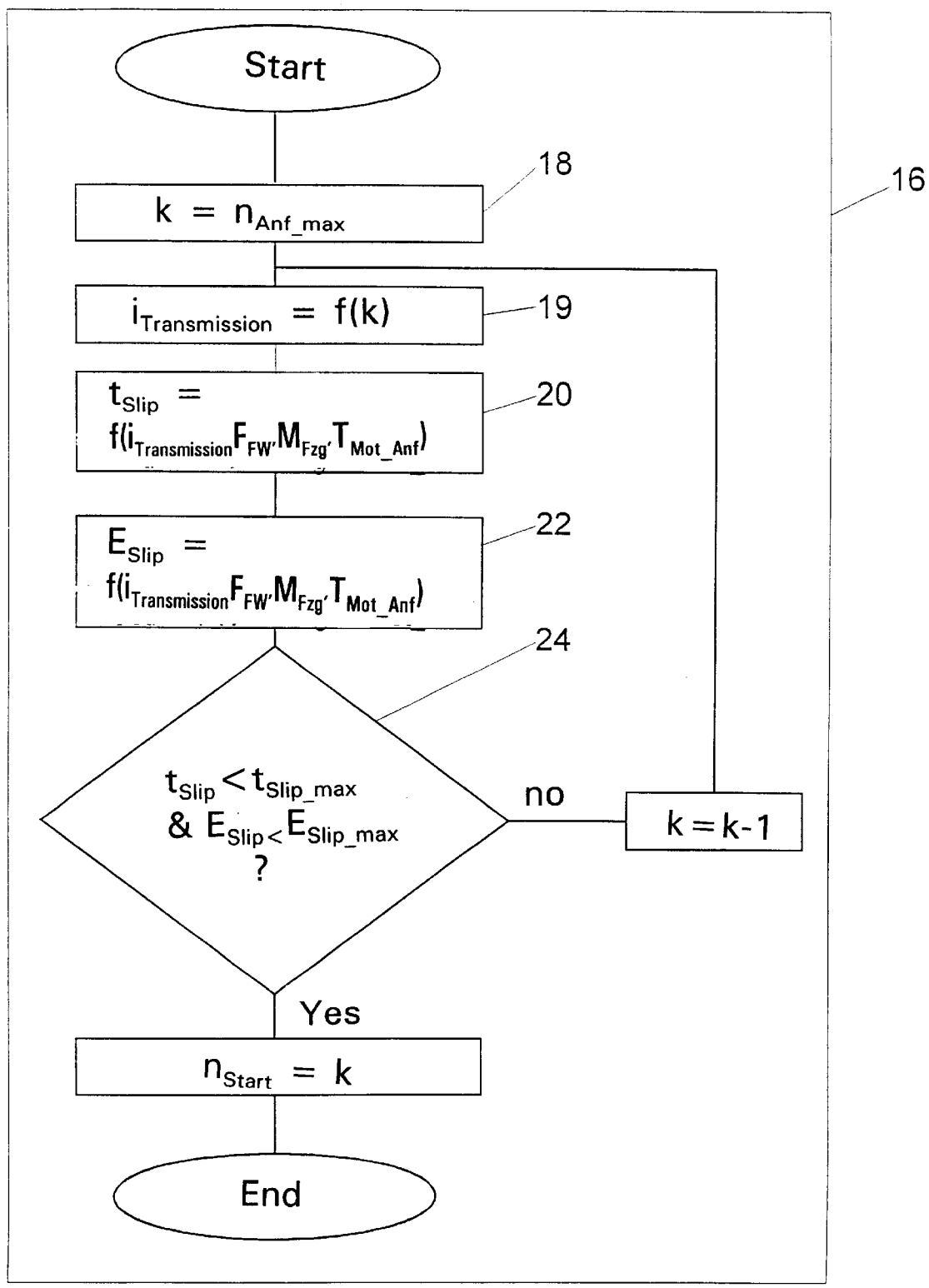
FIG. 2 a sequence diagram of one part of the inventive method.

The algorithm for determining the starting gear on which block 16 is based is explained with reference to FIG. 2. The metering variable k is first set in the block 18 equal to a value which corresponds to the highest gear step suitable for starting. In the block 19 the transmission ratio is determined according to the gear step. The transmission ratios of the gear steps are stored in the electronic control device. According to the ratio of the gear step, to the actual vehicle mass, to the actual tractional resistance and to the engine torque available, a probable value is precalculated for the slip time 20 an the frictional work 22 for each of said gear steps during the starting process. Said precalculated values are compared in the block 24 with the maximum admissible values 12, 14 which had previously been determined. If the precalculated values are smaller than or equal to the maximum admissible values, the actual value of the metering variable k is issued as starting gear step.

When at least one of the precalculated values is greater than the admissible value, the calculation loop is repeated with the next smaller gear step suitable for starting.

Aside from a few exceptional cases, the traction resistance is calculated during the travel constantly, that is, in short time intervals, so that this method always gives a suitable starting gear step in parked state of the vehicle.

Reference Numerals
2 vehicle acceleration
4 traction force
6 tractional resistance
8 vehicle mass
10 engine torque available for starting
12 maximum lip time admissible during the starting process
14 maximum frictional work admissible during the starting process
16 algorithm for determining the starting gear
17 block
18 block
20 probable slip time
22 probable frictional work
24 block

What is claimed is:

1. A method for determining a starting gear step for a vehicle having a stepped variable speed transmission with several gear steps, the method comprising the steps of:

connecting the stepped variable speed transmission on an input side by an engageable starting clutch with a prime mover that produces an engine torque;

connecting the stepped variable speed transmission on an output side with input wheels of the vehicle which transmit a traction force;

determining the starting gear step by an electronic control device at least in accordance with a vehicle mass (8) and one other parameter (6) dependent on a driving mode which comprises an uphill gradient resistance of the vehicle, and (a) determining a maximum value admissible for at least one of a slip time (12) and a maximum value admissible for frictional work (14) of the starting clutch during a starting process, the same as an engine torque (10) available for starting;

(b) beginning with a highest gear step (18) suitable for starting, values for at least one of at precalculated slip time (20) and precalculated frictional work (22) are determined in a calculation loop according to a ratio of the gear step (19), to the vehicle mass (8), to the other parameter (6) dependent on the driving mode and to the engine torque (10) available for starting;

(c) comparing the values for at least one of the precalculated slip time (20) and the precalculated frictional work (22) with at least one of the respective maximum value admissible for at least one of the slip time (12) and the maximum value admissible for frictional work (14);

(d) repeating the calculation loop with a next smaller gear step suitable for starting when at least one of the precalculated values is higher than the maximum admissible values; and (e) issuing a gear step as the starting gear step when the precalculated values are smaller than or equal to the maximum admissible values.

2. The method according to claim 1, further comprising the step of storing in an electronic control device the maximum values admissible for at least one of the slip time (12) and the frictional work (14) dependent on at least one of the road inclination (6), the vehicle mass (8) and the load state of a clutch (17).

3. The method according to claim 1, further comprising the step of determining the vehicle mass (8) by evaluating two temporarily offset measurements within a measuring period to determine at least one traction parameter produced by the prime mover which indicates a traction acting upon the input wheels of the vehicle in a direction of motion, and at least one motion parameter which indicates a motion of the vehicle wherein one of the two offset measurements takes place during a traction-free phase during which the starting clutch is open for the purpose of gear change of the stepped variable speed transmission and the other of the two offset measurements takes place during a traction phase during which the starting clutch is closed and a traction force is transmitted to the input wheels and an actual vehicle mass is calculated with the determined parameters of the two temporarily offset measurements.

4. The method according to claim 3, further comprising the step of determining the first of the two offset measurements during a first data collection period, and determining the second of the two offset measurements during a second data collection period, a duration of both data collection period is longer than a minimum duration, the traction parameter corresponds to a periodic integral of the traction force acting during the respective data collection period and a motion parameter corresponds to a speed change of the vehicle occurred during the respective data collection period.

5. The method according to claim 1, further comprising the step of determining an other parameter dependent on the driving mode from the vehicle mass (8), an actual traction force (4) and an actual vehicle acceleration (2) resulting therefrom while the vehicle moves.

6. The method according to claim 5, further comprising the step of determining the other parameter (6) dependent on the driving mode according to a rolling resistance of the vehicle.

* * * * *